(12) United States Patent
Rong et al.

(10) Patent No.: US 9,232,434 B2
(45) Date of Patent: Jan. 5, 2016

(54) SYSTEM AND METHOD FOR WIFI OFFLOAD

(71) Applicant: FutureWei Technologies, Inc., Plano, TX (US)

(72) Inventors: Zhigang Rong, San Diego, CA (US); Younghoon Kwon, San Diego, CA (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 142 days.

(21) Appl. No.: 14/070,982

(22) Filed: Nov. 4, 2013

(65) Prior Publication Data

US 2014/0126360 A1 May 8, 2014

Related U.S. Application Data

(60) Provisional application No. 61/723,722, filed on Nov. 7, 2012.

(51) Int. Cl.
*H04W 28/02* (2009.01)
*H04W 48/18* (2009.01)
*H04W 88/06* (2009.01)

(52) U.S. Cl.
CPC .......... *H04W 28/0289* (2013.01); *H04W 48/18* (2013.01); *H04W 88/06* (2013.01)

(58) Field of Classification Search
None
See application file for complete search history.

(56) References Cited

U.S. PATENT DOCUMENTS

| 6,636,506 | B1 * | 10/2003 | Fan ............................... 370/356 |
| 9,094,864 | B2 * | 7/2015 | Payyappilly ........ H04L 12/4633 |
| 2003/0043773 | A1 | 3/2003 | Chang |
| 2009/0268668 | A1 | 10/2009 | Tinnakornsrisuphap et al. |
| 2012/0099531 | A1 * | 4/2012 | Sfar .............................. 370/328 |

(Continued)

FOREIGN PATENT DOCUMENTS

| CN | 102209030 A | 10/2011 |
| CN | 102685927 A | 9/2012 |

(Continued)

OTHER PUBLICATIONS

International Search Report and Written Opinion received in International Application No. PCT/CN2013/086671 mailed Feb. 6, 2014, 11 pages.

(Continued)

*Primary Examiner* — Christine Duong
(74) *Attorney, Agent, or Firm* — Futurewei Technologies, Inc.

(57) ABSTRACT

Embodiments are provided for enabling WiFi offload by integrating the WiFi and cellular networks operations at a radio access network level. The embodiments include a WiFi network component configured to determine whether to send over a cellular air interface a packet designated for WiFi according to a predefined rule. If the rule is met, the WiFi network component sends the packet to a cellular network component over the cellular air interface. The cellular network component is configured to process the received packet for cellular transmission, and transmit the packet using the cellular air interface to a receiver device. The predefined rule comprises at least one of sending the packet using the cellular air interface if the packet belongs to a predefined packet type, if the packet has a size below a predefined threshold size, and if the nature of the destination address for the packet is a broadcast address.

20 Claims, 2 Drawing Sheets

(56) References Cited

U.S. PATENT DOCUMENTS

| | | |
|---|---|---|
| 2012/0230191 A1 | 9/2012 | Fang |
| 2013/0077482 A1* | 3/2013 | Krishna et al. ............... 370/230 |
| 2013/0182643 A1* | 7/2013 | Pazos et al. ................. 370/328 |
| 2013/0183935 A1* | 7/2013 | Holostov et al. .............. 455/411 |
| 2014/0112242 A1* | 4/2014 | Vilmur et al. ................. 370/327 |
| 2014/0369198 A1* | 12/2014 | Rinne .................. H04W 40/02 370/235 |

FOREIGN PATENT DOCUMENTS

| | | |
|---|---|---|
| EP | 1786153 A2 | 5/2007 |
| EP | 2461631 A2 | 6/2012 |
| WO | 2011087223 A2 | 7/2011 |
| WO | 2011148234 A1 | 12/2011 |
| WO | 2013043869 A1 | 3/2013 |

OTHER PUBLICATIONS

"3rd Generation Partnership Project; Technical Specification Group Services and System Aspects; IP flow mobility and seamless Wireless Local Area Network (WLAN) offload; Stage 2 (Release 10)," 3GPP TS 23.261 V10.1.0 , Sep. 2010, 22 pages.

Cariou, L, et al., "Carrier-Oriented WiFi for Cellular Offload," [Power Points Slides] IEEE 802.11-12/1123r0, Sep. 2012, 22 slides.

\* cited by examiner

SYSTEM AND METHOD FOR WIFI OFFLOAD

This application claims the benefit of U.S. Provisional Application No. 61/723,722 filed on Nov. 7, 2012 by Zhigang Rong et al. and entitled "System and Method for WiFi Offload," which is hereby incorporated herein by reference as if reproduced in its entirety.

TECHNICAL FIELD

The present invention relates to the field of wireless network communications, and, in particular embodiments, to a system and method for WiFi offload.

BACKGROUND

Data usage keeps rising in cellular networks due to the increasing popularity of smartphones and other personal or mobile communication devices. Operators are now experiencing cellular network congestion because of the high level of data usage. To alleviate the network congestion problem, operators are interested in offloading cellular data to WiFi networks as smartphones are being equipped with WiFi connecting capability, WiFi systems use license-free spectrum, and are widely deployed at relatively low cost. However, current WiFi approaches for offloading data try to solve the offloading problem at the Internet protocol (IP) layer or above. With these approaches, the entire data traffic under consideration is either offloaded to a WiFi network or kept on the cellular network. Some approaches only offload traffic for a specific destination IP address, while other traffic stays on the cellular network. These various approaches may have limited performance (e.g., in term of efficiently using the resource of the WiFi networks) depending on the amount and type of traffic. There is a need for an improved approach that takes advantage of aspects of both the WiFi and cellular networks.

SUMMARY OF THE INVENTION

In accordance with an embodiment, a method for handling WiFi offload in WiFi and cellular networks includes determining, at a WiFi network component, whether to send over a cellular air interface a packet designated for WiFi according to a predefined rule including at least one of a type of the packet, a size of the packet, and a nature of a destination address for the packet. Upon determining to send the packet using the cellular air interface, the packet is sent to a cellular network component.

In accordance with another embodiment, a WiFi network component configured for handling WiFi offload in WiFi and cellular networks includes at least one processor and a non-transitory computer readable storage medium storing programming for execution by the at least one processor. The programming includes instructions to determine whether to send over a cellular air interface a packet designated for WiFi according to a predefined rule including at least one of a type of the packet, a size of the packet, and a nature of a destination address for the packet. Upon determining to send the packet using the cellular air interface, the WiFi network component sends the packet to a cellular network component over the cellular air interface. The WiFi network component is an access point for a WiFi network, and the cellular network component is a base station for a cellular network. Alternatively, the WiFi network component is a station entity in a user communication device configured for transmitting and receiving data over a WiFi link, and the cellular network component is a user equipment (UE) entity in the user communication device configured for transmitting and receiving data over the cellular air interface.

In accordance with another embodiment, a method for handling WiFi offload in WiFi and cellular networks includes receiving, at a cellular network component, a packet from a WiFi network component. The packet is offloaded from the WiFi network component according to a predefined rule including at least one of a type of the packet, a size of the packet, and a nature of a destination address for the packet. The method further includes processing the packet for cellular transmission, and transmitting the packet using a cellular air interface to a second cellular network component.

In accordance with another embodiment, a cellular network component configured for handling WiFi offload in WiFi and cellular networks includes at least one processor and a non-transitory computer readable storage medium storing programming for execution by the at least one processor. The programming includes instructions to receive a packet from a WiFi network component. The packet is offloaded from the WiFi network component according to a predefined rule including at least one of a type of the packet, a size of the packet, and a nature of a destination address for the packet. The cellular network component then processes the packet for cellular transmission, and transmits the packet using a cellular air interface to a second cellular network component. The cellular network component is a base station for a cellular network, and the WiFi network component is an access point for a WiFi network. Alternatively, the cellular network component is a UE entity in a user communication device configured for transmitting and receiving data over the cellular air interface, and the WiFi network component is a station entity in the user communication device configured for transmitting and receiving data over a WiFi link.

In accordance with another embodiment, a method for handling WiFi offload in WiFi and cellular networks includes receiving, at a cellular network component, a packet from a second cellular network component over a cellular air interface. The packet is offloaded from a WiFi network component to the second cellular network component according to a predefined rule including at least one of a type of the packet, a size of the packet, and a nature of a destination address for the packet. The method further includes determining that the packet is designated for WiFi reception, and processing the packet for WiFi reception. The packet is then forwarded to a second WiFi network component.

In accordance with another embodiment, a cellular network component configured for handling WiFi offload in WiFi and cellular networks includes at least one processor and a non-transitory computer readable storage medium storing programming for execution by the at least one processor. The programming includes instructions to receive a packet from a second cellular network component over a cellular air interface. The packet is offloaded from a WiFi network component to the second cellular network component according to a predefined rule including at least one of a type of the packet, a size of the packet, and a nature of a destination address for the packet. The cellular network component is further configured to determine that the packet is designated for WiFi reception, process the packet for WiFi reception, and forward the packet to a second WiFi network component. The cellular network component is a base station for a cellular network, and the WiFi network component is an access point for a WiFi network. Alternatively, the cellular network component is a UE entity in a user communication device configured for transmitting and receiving data over a cellular air interface, and the WiFi network component is a station entity in the user communication device configured for transmitting and receiving data over a WiFi link.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Current approaches to offloading data traffic between a cellular network and a WiFi network do not consider integration of the cellular and WiFi networks at the radio access network (RAN) level. One of the issues pointed out by operators for WiFi offload is that the WiFi system suffers from low performance in relatively high user density environment. A possible reason may be that multiple control/management packets with small size are generated, resulting in low efficiency for the WiFi system. By contrast, the cellular network (e.g., LTE or HSPA) can carry small size packets more efficiently due to the use of technologies such as orthogonal frequency-division multiple access (OFDMA), single carrier frequency-division multiple access (SC-FDMA), and/or centralized scheduling.

Embodiments are provided herein for enabling WiFi offload by integrating the WiFi and LTE operations at a radio access network (RAN) level. As such, different types of packets can be carried in different radio access technologies (RATs), such as WiFi, LTE, HSPA, or other RATs. The embodiments include selecting a WiFi or cellular (e.g., LTE) RAT for transmitting a data or other type packet according to one or more characteristics of the packet. For example, if the packet belongs to a predefined set of packet types, such as a WiFi probe response frame, or if the size of the packet is smaller than a predefined threshold, then the packet is transmitted using the cellular network, which is more efficient for carrying such small packets. Otherwise, the packet is transmitted using the WiFi network. In another example, a RAT that is more suitable for carrying the broadcast or unicast type of the considered packet is selected to transmit the packet. As such, WiFi offload and WiFi system performance and transmission efficiency is improved, such as in a relatively high user density environment. This RAT selection scheme according to one or more characteristics of the packet may be implemented with cellular and WiFi networks and devices, such as eNodeBs (eNBs), access points (APs), and user devices with WiFi capabilities, e.g., smartphones, tablets, and the like.

Figure 1:
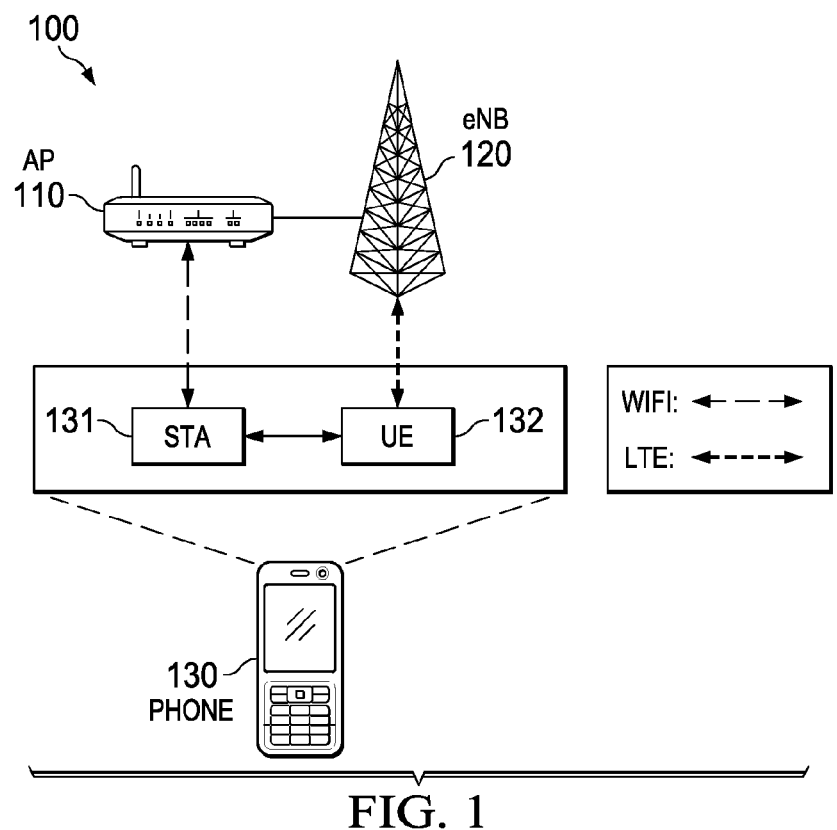
FIG. 1 illustrates an embodiment system for handling WiFi offload.

FIG. 1 shows an embodiment system 100 for handling WiFi offload. The system 100 includes a WiFi access point (AP) 110 (e.g., a WiFi modem/router) and a base station 120 (e.g. a eNB). The WiFi AP 110 and base station 120 may be colocated or connected, for instance via a high speed link (e.g., optical fiber). This enables fast data exchange between the AP 110 and base station 120. For example, the AP 110 and base station 120 are an AP and eNB, respectively, owned by the same operator. The system 100 also includes a user device 130 configured to communicate with the AP 110, e.g., via WiFi link, and the base station 120, e.g., via a cellular link or air interface such as LTE. The user device 130 supports two RAT interfaces or entities: a station (STA) 131 for communicating with the AP 110 using a WiFi link, and a user equipment (UE) 132 for communicating with the base station (e.g., eNB) using a cellular (e.g., LTE) link. The two entities at the user device 110 can be implemented via software, hardware, or both.

When having packets to send to the AP 110 (on uplink), the STA 131 determines, based on one or more rules, whether to transmit the packet directly to the AP 110 on the WiFi link or via the UE 132 on the cellular link. In the case, the STA 131 determines to send the packet designated for the AP 110 on the cellular link, the packet is passed to the UE 132 which in turn sends the packet to the base station 120 on the cellular link. The UE 132 may translate or encapsulate the packet into a format suitable for transmission on the cellular link. Upon receiving the packet on the cellular link from the UE 132, the base station 120 then forwards the packet to the AP 110, e.g., via the high speed connection between the AP 110 and the base station 120. The base station 120 may also decapsulate the packet before forwarding, in the case encapsulation was used at the UE 132.

A similar scheme can be used when sending packets from the AP 110 to the user device 130 (on downlink). In this case, the AP 110 determines whether to transmit the packet using WiFi or cellular links. In the case, the AP 110 determines to send the packet designated for the user device 130 on the cellular link, the packet is passed to the base station 120 which in turn sends the packet to the UE 132 on the cellular link. The base station 120 may translate or encapsulate the packet into a format suitable for transmission on the cellular link. Upon receiving the packet on the cellular link from the base station 120, the UE 132 then forwards the packet to the STA 131. The UE 132 may also decapsulate the packet before forwarding, in the case encapsulation was used at the base station 120.

One rule that can be used at the STA 131 or the AP 110 is determining a RAT (WiFi or cellular) for transmission based on the packet type. A set of packet types can be defined such that if a packet falls into a predefined set, then the packet is carried on the cellular link. Otherwise, the packet is carried on the WiFi link. For instance, the set can be defined to include WiFi control/management frame types, such as a Probe Response Frame. Thus, if a WiFi probe response frame belonging to the defined set is to be transmitted, the frame is carried on the cellular link. On the other hand, if the packet is a data or other frame and does not belong to a predefined set, then it is carried on the WiFi link. A second rule that can be used is to determine the RAT for transmission based on the packet size. For example, if the packet size is smaller than a predefined threshold, it is carried on the cellular link. Otherwise, the packet is carried on the WiFi link. A third rule that can be used is to select the RAT based on the nature of the destination address of the packet. For example, if the packet is broadcast type, then it is carried on the cellular link. Alternatively, if the packet is unicast, it is carried on the WiFi link. The rules above can be implemented or used in separate embodiments. Any combination of such rules can also be used in the same implementation.

In an example for using the first rule above based on the packet type, the AP 110 has a probe response frame (PRF) to send to the user device 130. Based on the rule, it is determined that the PRF is to be carried over the cellular link. Therefore, the AP 110 forwards the PRF to the base station 120. The base station 120 processes the PRF, adding a protocol layer (e.g., radio link control (RLC)) header to the PRF. This header contains information indicating that this packet is for WiFi so that the UE 132, upon receiving the packet, can correctly forward the packet to the STA 131. The base station 120 sends the processed PRF to the UE 132 through the cellular link. The UE 132, upon receiving the processed PRF from the base station 120, reads the RLC header, and therefore is aware that this packet is for WiFi. Hence, the UE 132 forwards the packet to the STA 131, and the STA 131 acts accordingly based on the received PRF.

In another example of the second rule above based on the packet size, the STA 131 has a small packet to send to the AP 110. Based on the rule, the size of the small packet is less that the predefined threshold and thus it is determined to send the packet on the cellular link. The STA 131 then forwards the packet to the UE 132. The UE 132 processes the packet, adding a protocol layer (e.g., RLC) header to the packet. This header contains information indicating that this packet is for WiFi so that the base station 120, upon receiving the packet, can correctly forward the packet to the AP 110. The UE 132 sends the processed packet to the base station 120 through the cellular link. The base station 120, upon receiving the processed packet from the UE 132, reads the RLC header, and therefore is aware that this packet is for WiFi. The base station 120 then forwards the packet to the AP 110, and the AP 110 acts accordingly based on the received packet.

In the system 100, the UE 132 and the base station 120 can process the packets forwarded from the STA 131 and the AP 110, respectively, using any of a plurality of suitable methods. In a first method, the received packets are encapsulated by adding a cellular (e.g., LTE or HSPA) protocol layer headers to the packets. For example, a RLC header is added to a received packet, as described above. In a second method, the UE 132/base station 120 converts the received packets such that some of the WiFi specific fields can be removed to reduce the overhead. For example, the address field of the STA 131/ AP 110 can be removed, where the UE 132/base station 120 is aware of this address information. Hence, this information is not needed in the packet for transmission over the cellular link (e.g., LTE air interface).

Using the RAT selection scheme base on the packet type/ size/nature of the destination address or other suitable rules, the system 100 utilizes radio resources more efficiently by integrating WiFi and cellular networks at the RAN level. For example, carrying small packets over LTE is more efficient than carrying such packets over WiFi. Further, carrying large data packets over WiFi is more efficient than doing so over LTE. This scheme can lead to enhanced WiFi offload performance in a high user density environment, as small packet transmission over WiFi is less of an issue. Further, this scheme provides higher overall system capacity and a better user experience due to the more efficient utilization of radio resources for both WiFi and cellular systems.

Figure 2:
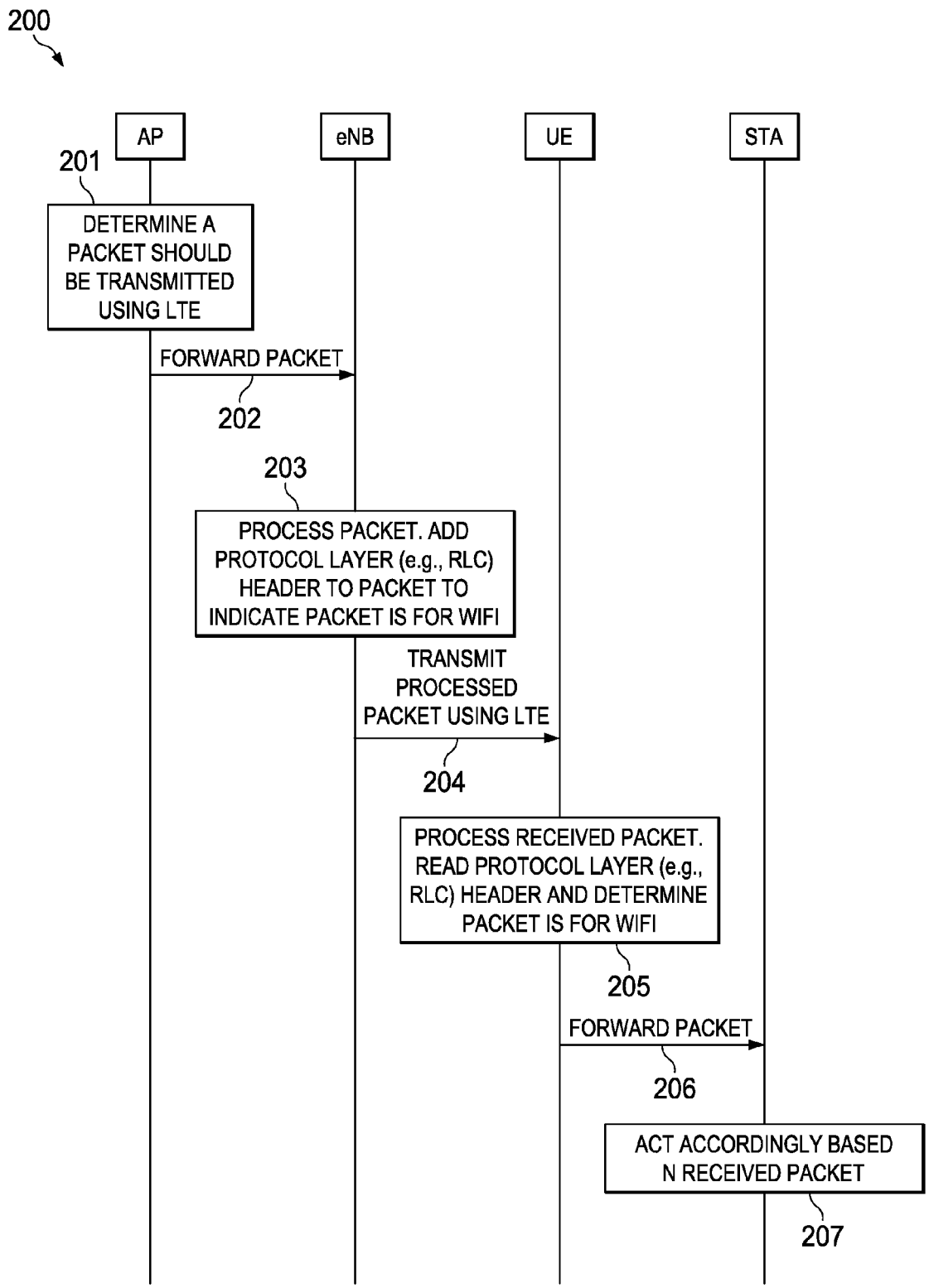
FIG. 2 illustrates an embodiment protocol for handling WiFi offload.

FIG. 2 shows an exemplary flow diagram of an embodiment protocol 200 for handling WiFi offload. The protocol 200 is implemented in a system (e.g., system 100) comprising both WiFi and cellular (e.g., LTE) network components. At step 201, an AP (e.g., AP 110) determines a packet is to be transmitted using the cellular (e.g., LTE) air interface. At step 202, the packet is sent to a base station (e.g., eNB). The base station may be collocated with the AP, e.g., in the same place or area or within a relatively short distance. Alternatively, the base station and the AP may be separated by a relatively large distance, e.g., at distant geographic locations, and connected via a high speed link (e.g., optical fiber). The high speed link ensures that the forwarded WiFi packet is delivered to the final destination (e.g., the user) according to the quality of service (QoS) requirement and/or other criteria, such as ensuring quality of experience (QoE) to user. At step 203, the base station receives and processes the packet, which may include adding a protocol layer (e.g., RLC) header to the packet to indicate the packet is for WiFi. At step 204, the packet is sent to a UE entity (e.g., UE 132) at a user device using the cellular air interface. At step 205, the UE entity at the user device receives and processes the packet, which may include reading the protocol layer header and determining the packet is for WiFi. At step 206, the UE entity sends the packet to the STA entity at the user device. At step 207, the STA entity acts accordingly (performs suitable operation/processing) based on the received packet information.

Figure 3:
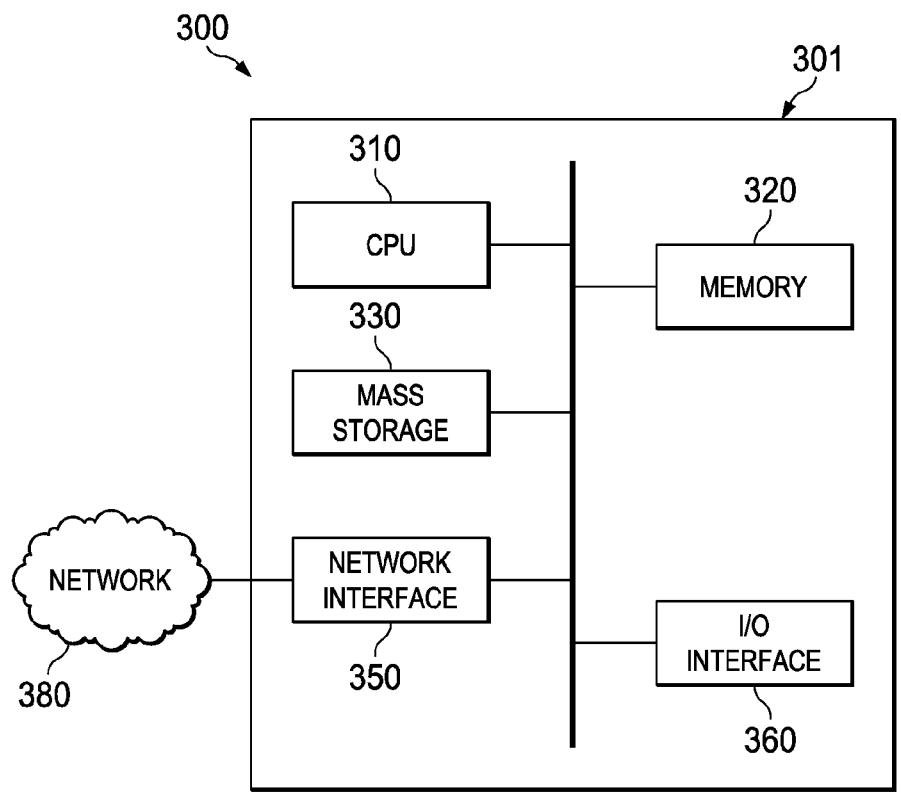
FIG. 3 is a diagram of an exemplary processing system that can be used to implement various embodiments.

FIG. 3 is a block diagram of an exemplary processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for handling WiFi offload in WiFi and cellular networks, the method comprising:
   determining, by a WiFi network component, whether to send over a cellular air interface a packet designated for a WiFi network according to a predefined rule, wherein the predefined rule comprise at least one of: sending the packet over the cellular air interface only when the packet is a control or management packet, and sending the packet over the cellular air interface only when a destination address of the packet is a broadcast address; and
   upon determining to send the packet using the cellular air interface, sending, by the WiFi network component, the packet to a cellular network component.

2. The method of claim 1 further comprising sending the packet over a WiFi link to a second WiFi network component upon determining that the predefined rule is not met.

3. A WiFi network component configured for handling WiFi offload in WiFi and cellular networks, the WiFi network component comprising:
   at least one processor; and
   a non-transitory computer readable storage medium storing programming for execution by the at least one processor, the programming including instructions to:
      determine whether to send over a cellular air interface a packet designated for a WiFi network according to a predefined rule, wherein the predefined rule comprise at least one of: sending the packet over the cellular air interface only when the packet is a control or management packet, and sending the packet over the cellular air interface only when a destination address of the packet is a broadcast address; and
      upon determining to send the packet using the cellular air interface, send the packet to a cellular network component over the cellular air interface.

4. The WiFi network component of claim 3, wherein the programming includes further instructions to send the packet over a WiFi link to a second WiFi network component upon determining that the predefined rule is not met.

5. The WiFi network component of claim 3, wherein the WiFi network component is an access point for the WiFi network, and wherein the cellular network component is a base station for the cellular network.

6. The WiFi network component of claim 5, wherein the access point and the base station are collocated in a same area.

7. The WiFi network component of claim 5, wherein the access point and the base station are coupled to each other via a high speed connection which ensures forwarding the packet at a speed that meets a quality of service (QoS) requirement.

8. The WiFi network component of claim 3, wherein the WiFi network component is a station entity in a user communication device, the station entity configured for transmitting and receiving data over a WiFi link, and wherein the cellular network component is a user equipment (UE) entity in the user communication device, the UE entity configured for transmitting and receiving data over the cellular air interface.

9. A method for handling WiFi offload in WiFi and cellular networks, the method comprising:
   receiving, by a cellular network component, a packet offloaded from a WiFi network component, wherein the packet is a control or management packet;
   adding a radio link control (RLC) header to the packet, wherein the header contains information indicating that the packet is designated for a WiFi network; and
   transmitting the packet with the header using a cellular air interface to a second cellular network component.

10. A cellular network component configured for handling WiFi offload in WiFi and cellular networks, the cellular network component comprising:
    at least one processor; and
    a non-transitory computer readable storage medium storing programming for execution by the at least one processor, the programming including instructions to:
       receive a packet offloaded from a WiFi network component, wherein the packet is a control or management packet;
       adding a radio link control (RLC) header to the packet, wherein the header contains information indicating that the packet is designated for a WiFi network; and
       transmit the packet with the header using a cellular air interface to a second cellular network component.

11. The cellular network component of claim 10, wherein the cellular network component is a base station for the cellular network, and wherein the WiFi network component is an access point for the WiFi network.

12. The cellular network component of claim 11, wherein the base station and the access point are collocated in a same area.

13. The cellular network component of claim 11, wherein the base station and the access point are coupled to each other via a high speed connection which ensures forwarding the packet at a speed that meets a quality of service (QoS) requirement.

14. The cellular network component of claim 10, wherein the cellular network component is a user equipment (UE) entity in a user communication device, the UE entity configured for transmitting and receiving data over the cellular air interface, and wherein the WiFi network component is a station entity in the user communication device, the station entity configured for transmitting and receiving data over a WiFi link.

15. A method for handling WiFi offload in WiFi and cellular networks, the method comprising:
receiving, by a cellular network component, a packet with a radio link control (RLC) header from a second cellular network component over a cellular air interface, the packet offloaded from a WiFi network component to the second cellular network component, wherein the packet is a control or management packet, and the header contains information indicating that the packet is for a WiFi network;
determining that the packet is designated for the WiFi network;
removing the RLC header from the packet; and
forwarding the packet to a second WiFi network component.

16. A cellular network component configured for handling WiFi offload in WiFi and cellular networks, the cellular network component comprising:
at least one processor; and
a non-transitory computer readable storage medium storing programming for execution by the at least one processor, the programming including instructions to:
receive a packet with a radio link control (RLC) header from a second cellular network component over a cellular air interface, the packet offloaded from a WiFi network component to the second cellular network component, wherein the packet is a control or management packet, and the header contains information indicating that the packet is for a WiFi network;
determine that the packet is designated for the WiFi network;
removing the RLC header from the packet; and
forward the packet to a second WiFi network component.

17. The cellular network component of claim 16, wherein the cellular network component is a base station for the cellular network, and wherein the WiFi network component is an access point for the WiFi network.

18. The cellular network component of claim 17, wherein the base station and the access point are collocated in a same area.

19. The cellular network component of claim 17, wherein the base station and the access point are coupled to each other via a high speed connection which ensures forwarding the packet at a speed that meets a quality of service (QoS) requirement.

20. The cellular network component of claim 16, wherein the cellular network component is a user equipment (UE) entity in a user communication device, the UE entity configured for transmitting and receiving data over a cellular air interface, and wherein the WiFi network component is a station entity in the user communication device, the station entity configured for transmitting and receiving data over a WiFi link.

* * * * *